(12) United States Patent
Matsui et al.

(10) Patent No.: US 7,839,632 B2
(45) Date of Patent: Nov. 23, 2010

(54) ELECTRONIC HANDHELD DEVICE

(75) Inventors: Motoyuki Matsui, Akishima (JP);
Masatoshi Ohtaka, Hidaka (JP);
Yasunori Chiba, Tachikawa (JP)

(73) Assignee: Casio Computer Co., Ltd., Tokyo (JP)

(*) Notice: Subject to any disclaimer, the term of this patent is extended or adjusted under 35 U.S.C. 154(b) by 138 days.

(21) Appl. No.: 12/144,087

(22) Filed: Jun. 23, 2008

(65) Prior Publication Data
US 2009/0002926 A1 Jan. 1, 2009

(30) Foreign Application Priority Data
Jun. 26, 2007 (JP) .............................. P2007-167343

(51) Int. Cl.
*H05K 5/00* (2006.01)
(52) U.S. Cl. ............................ 361/679.55; 361/679.08; 361/679.01; 400/472; 341/22; 345/168
(58) Field of Classification Search ............ 361/679.08, 361/679.55, 679.01; 400/472; 341/22; 345/168
See application file for complete search history.

(56) References Cited

U.S. PATENT DOCUMENTS

| 5,801,918 A * | 9/1998 | Ahearn et al. .......... 361/679.55 |
| 5,907,148 A | 5/1999 | Iwafuchi et al. |
| 2003/0002901 A1* | 1/2003 | Sellers ...................... 400/472 |
| 2008/0048971 A1* | 2/2008 | Beckhusen et al. .......... 345/156 |

FOREIGN PATENT DOCUMENTS

| JP | 2000-163529 A | 6/2000 |
| JP | 2006-333264 A | 12/2006 |

* cited by examiner

*Primary Examiner*—Jayprakash N Gandhi
*Assistant Examiner*—Ingrid Wright
(74) *Attorney, Agent, or Firm*—Holtz, Holtz, Goodman & Chick, PC

(57) ABSTRACT

An electronic handheld device includes: a case that is formed in a longitudinal boxed shape; a first operation key that is provided on a front face of the case at a position that is located at an approximate center of the front face; and a first concave portion that is formed on a back face of the case at a first position opposite the position of the first operation key, the first concave portion being arched toward a top end of the case.

22 Claims, 9 Drawing Sheets

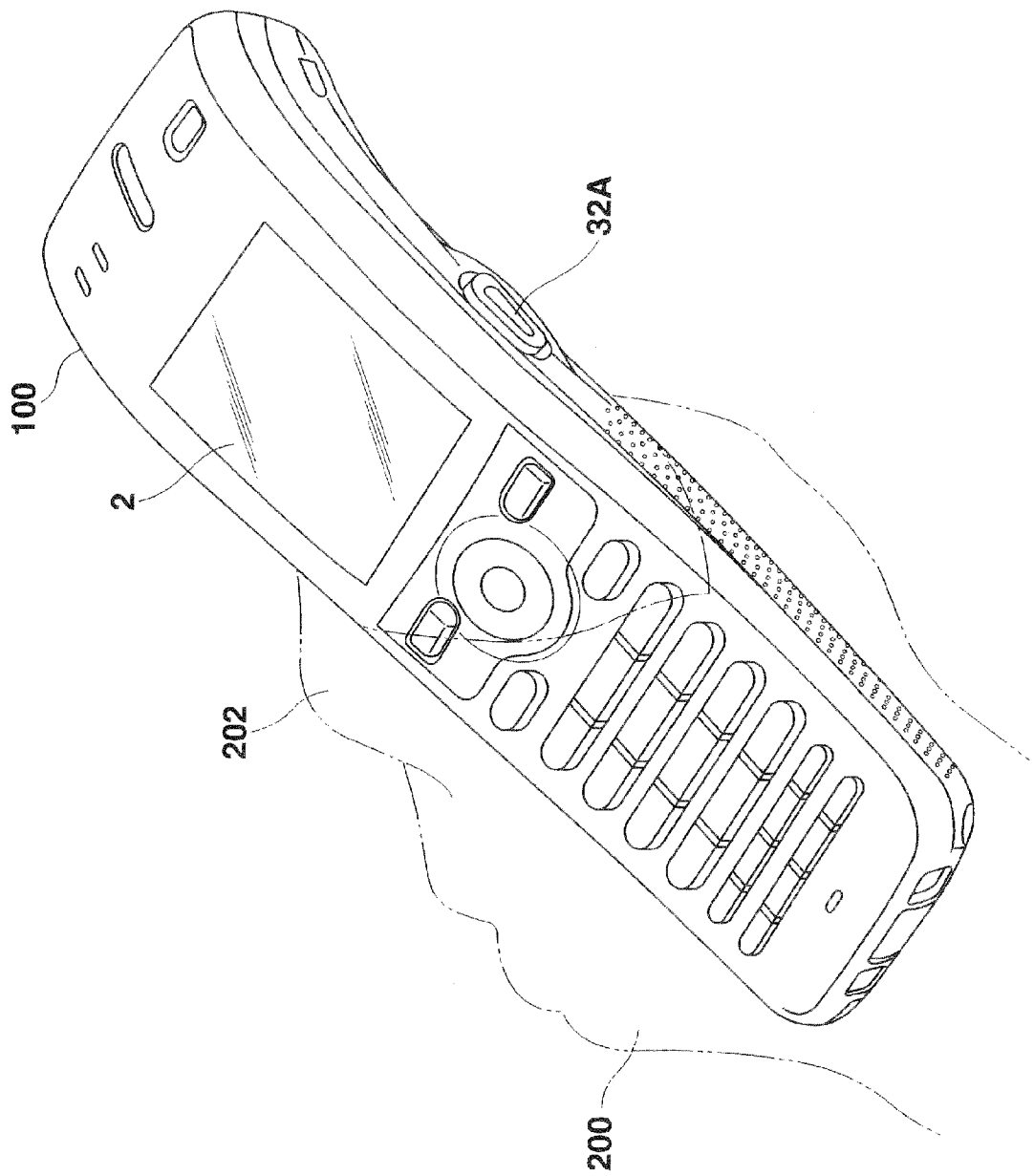

US 7,839,632 B2

ELECTRONIC HANDHELD DEVICE

CROSS-REFERENCE TO THE RELATED APPLICATION(S)

The present application is based upon and claims priority from prior Japanese Patent Application No. 2007-167343, filed on Jun. 26, 2007, the entire content of which are incorporated herein by reference.

TECHNICAL FIELD

The present invention relates to an electronic handheld device.

BACKGROUND

Conventionally, an electronic handheld device is widely used in a Point of Sale (POS) system for managing and assisting sales and services in retail stores. The electronic handheld device is configured to optically scan barcodes that are attached to merchandise and to input various information through operation keys. The electronic handheld device designed for such use is called "handy terminal" in some countries including Japan.

There are proposed various configurations for improving operability of the electronic handheld device. For example, for the electronic handheld device that is capable of scanning barcode information and reading information recorded in a noncontact IC card of a customer using electromagnetic induction, there is proposed a configuration to match a direction in which the barcodes are scanned and a direction in which the IC cards are read. An example of such configuration is disclosed in JP-A-2000-163529. According to the electronic handheld device thus configured, the user can perform scanning the barcodes and reading the IC cards with the electronic handheld device being oriented in the same direction.

Since the electronic handheld device is generally used by the user in a manner to operate a laser trigger key for scanning barcodes and ten keys while holding the device in one hand, a further improvement in usability and design for easy-to-grip is requested.

SUMMARY

According to a first aspect of the present invention, there is provided an electronic handheld device including: a case that is formed in a longitudinal boxed shape; a first operation key that is provided on a front face of the case at a position that is located at an approximate center of the front face; and a first concave portion that is formed on a back face of the case at a first position opposite the position of the first operation key, the first concave portion being arched toward a top end of the case.

According to a second aspect of the present invention, there is provided an electronic handheld device including: a case that is formed in a longitudinal boxed shape; a first operation key that is provided on a front face of the case at a position that is located at an approximate center of the front face; a first concave portion that is formed on a back face of the case at a first position opposite the position of the first operation key, the first concave portion being arched toward a top end of the case; a second concave portion that is formed on the back face at a second position that is located between the first position and a bottom end of the case, the second concave portion being arched toward the top end of the case; and a second operation key that is provided on the front face of the case at a position opposite the second position.

BRIEF DESCRIPTION OF THE DRAWINGS

In the accompanying drawings:

FIG. 9 is a view showing a state where the user is operating another side trigger key while holding the electronic handheld device in left hand.

DETAILED DESCRIPTION

Figure 1:
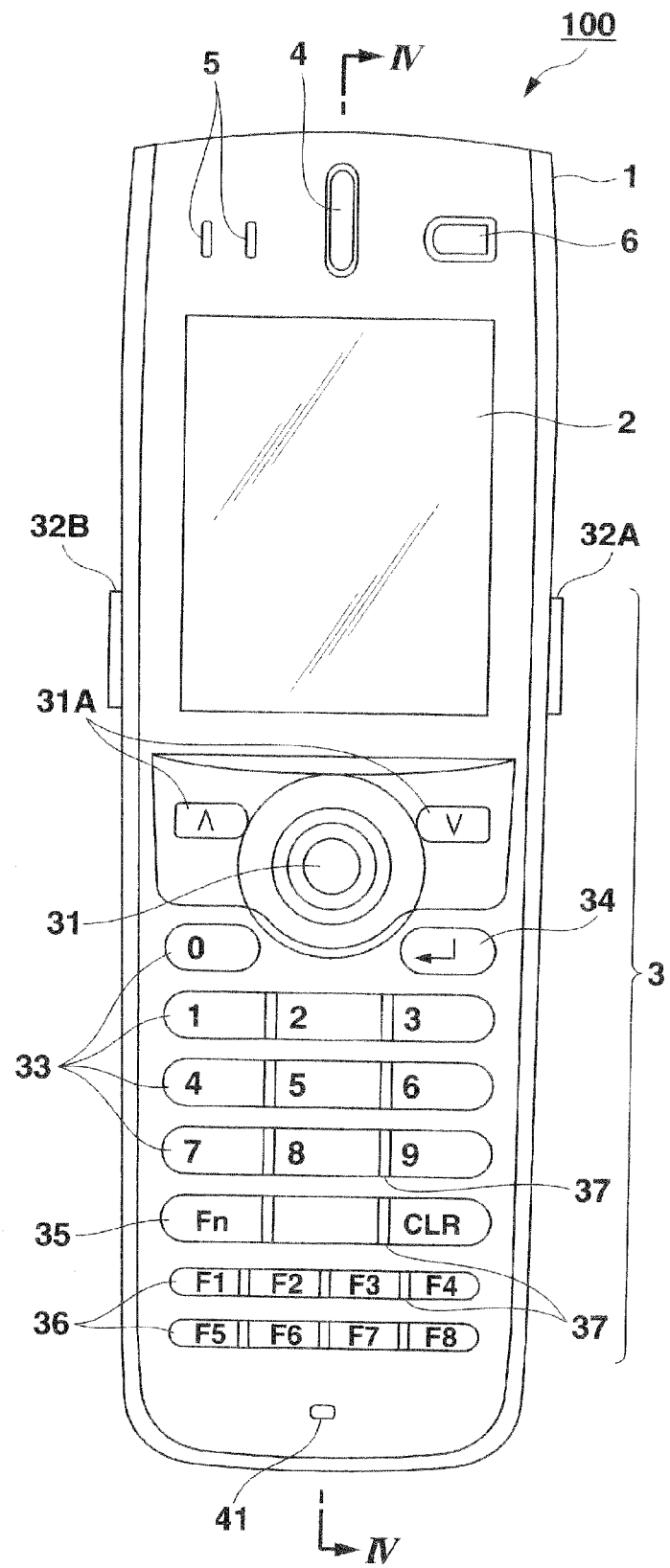
FIG. 1 is a front view of an electronic handheld device of an embodiment according to the present invention.

An embodiment according to the present invention will be described in detail with reference to the accompanying drawings. The scope of the claimed invention should not be limited to an example illustrated in the drawings.

Figure 2:
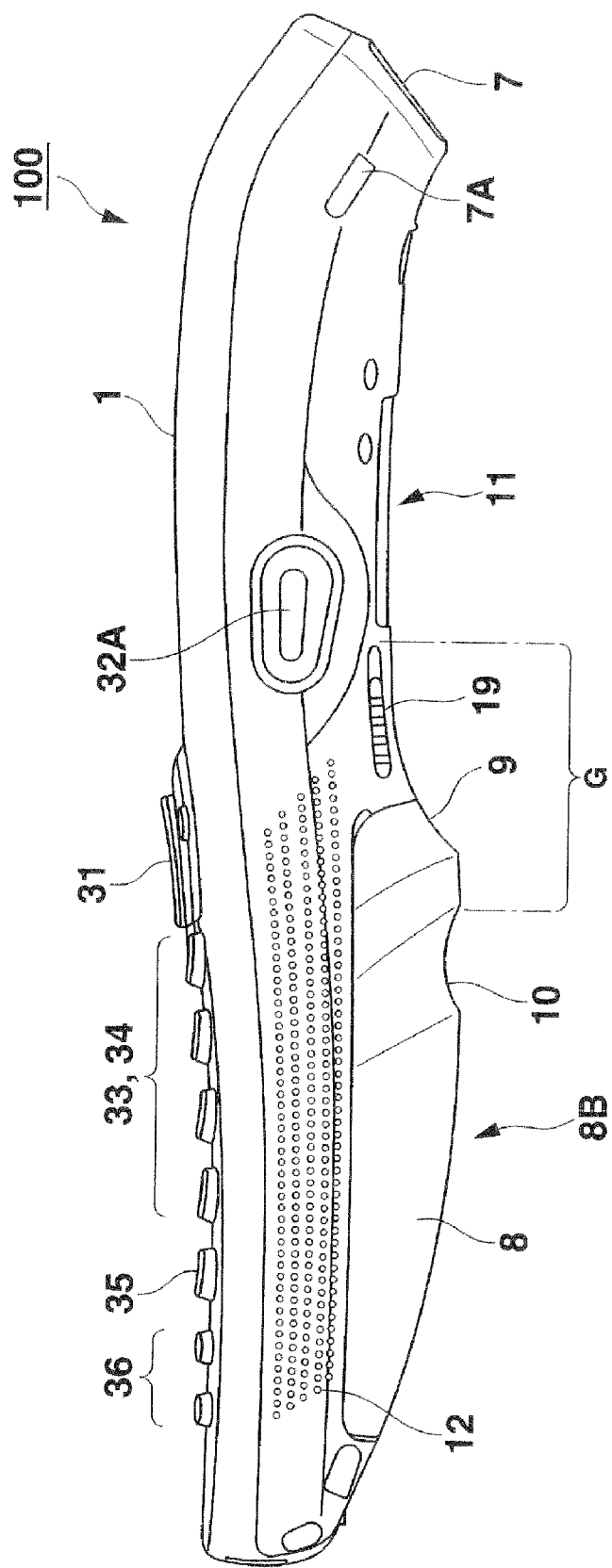
FIG. 2 is a side view of the electronic handheld device.
Figure 3:
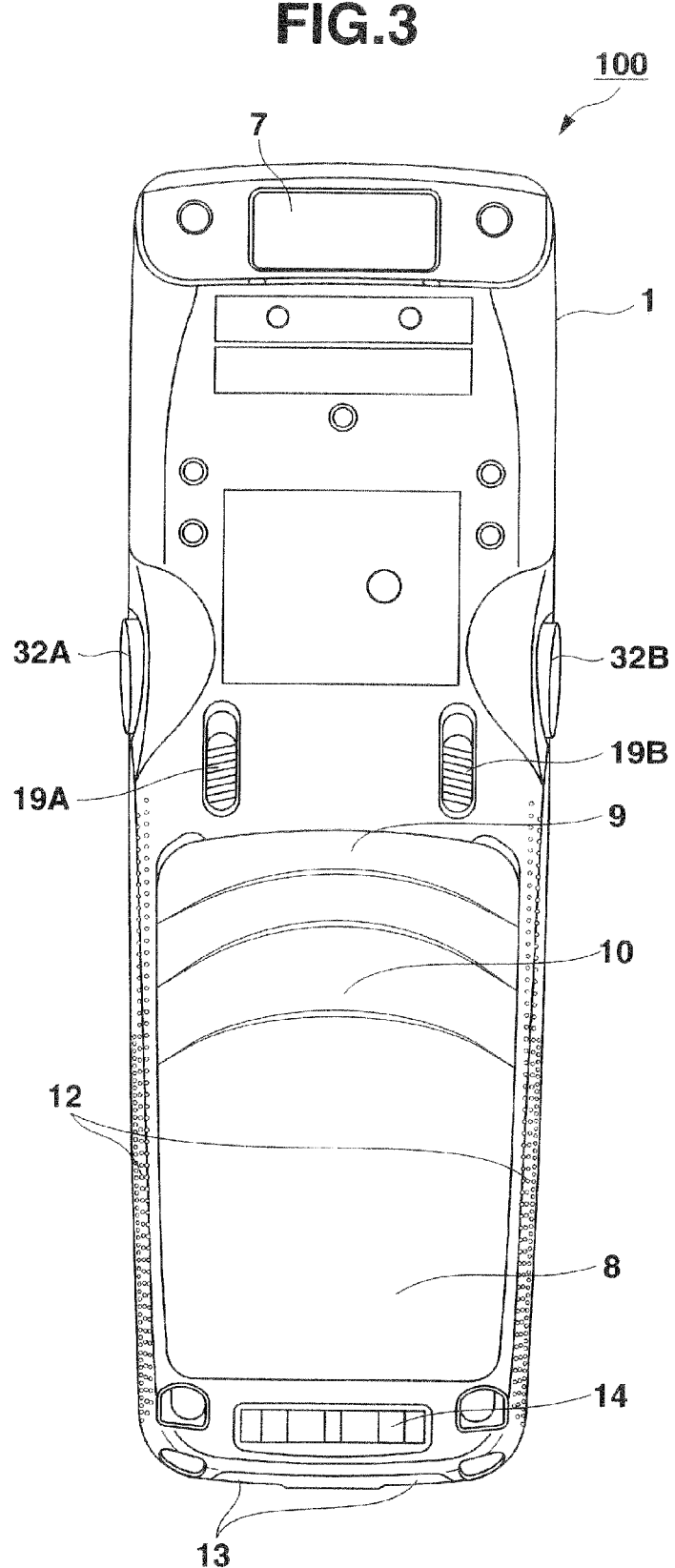
FIG. 3 is a rear view of the electronic handheld device.

A configuration of an electronic handheld device 100 according to the embodiment of the present invention will be described with reference to FIGS. 1-5. FIGS. 1-3 show an external configuration of the electronic handheld device 100. FIG. 1 shows a front configuration of the electronic handheld device 100. FIG. 2 shows a side configuration of the electronic handheld device 100. FIG. 3 shows a rear configuration of the electronic handheld device 100.

The electronic handheld device 100 is provided with a function for accepting key input and a function for scanning barcodes. The electronic handheld device 100 is used as a handheld device for supporting a retail store, such as a convenience store. The electronic handheld device 100 is operated by a user, such as a shop personnel of the retail store, and scans barcodes attached to the merchandise for the purpose of calculating purchased amount and when taking inventory and accepts key input for inputting numerical information, such as quantity of inventory and quantity of order.

As shown in FIG. 1, the electronic handheld device 100 is provided with has a case 1. The electronic handheld device 100 includes a display 2, an operating portion 3, a speaker 4, indicators 5, a power switch 6 and a microphone 41, which are provided on the front face of the case 1.

In the following description, a leading end part in the longitudinal direction toward a side where the speaker 4 is provided is described as a top end, and an opposite end part is described as a bottom end.

The case 1 is made of the material, such as ABS (Acrylonitrile Butadiene Styrene) resin. The display 2 is provided with an LCD (Liquid Crystal Display) panel for displaying various information. The display 2 may be provided with other display devices, such as an ELD (Electro-Luminescent Display) panel for displaying the information The operating portion 3 has various operation keys, and accepts the key input from the user. The operating portion 3 is provided with: a center trigger key 31 and a pair of cursor keys 31A, which serve as a first operation key; side trigger keys 32A, 32B, which serve as a third operation key; and numeric keypads 33, an enter key 34, and a function key 35, which serve as a second operation key. In the operating portion 3, ribs 37 are provided for partitioning the respective keys.

The center trigger key 31 and the side trigger keys 32A, 32B are used for accepting input for scanning barcodes by a scanner unit 7, which will be described later. The center trigger key 31 is provided on the front face of the case 1 at a position near a center position of the case 1. The cursor keys 31A are respectively provided at left and right sides of the center trigger key 31 on the front face of the case 1. The cursor key 31A is for accepting input for a vertical movement of a cursor displayed on the display 2. The side trigger key 32A is provided on the right face of the case 1 at a position toward the top end from the position where the center trigger key 31 is provided. The side trigger key 32B is provided on the left face of the case 1 at a position toward the top end from the position where the center trigger key 31 is provided.

Figure 6:
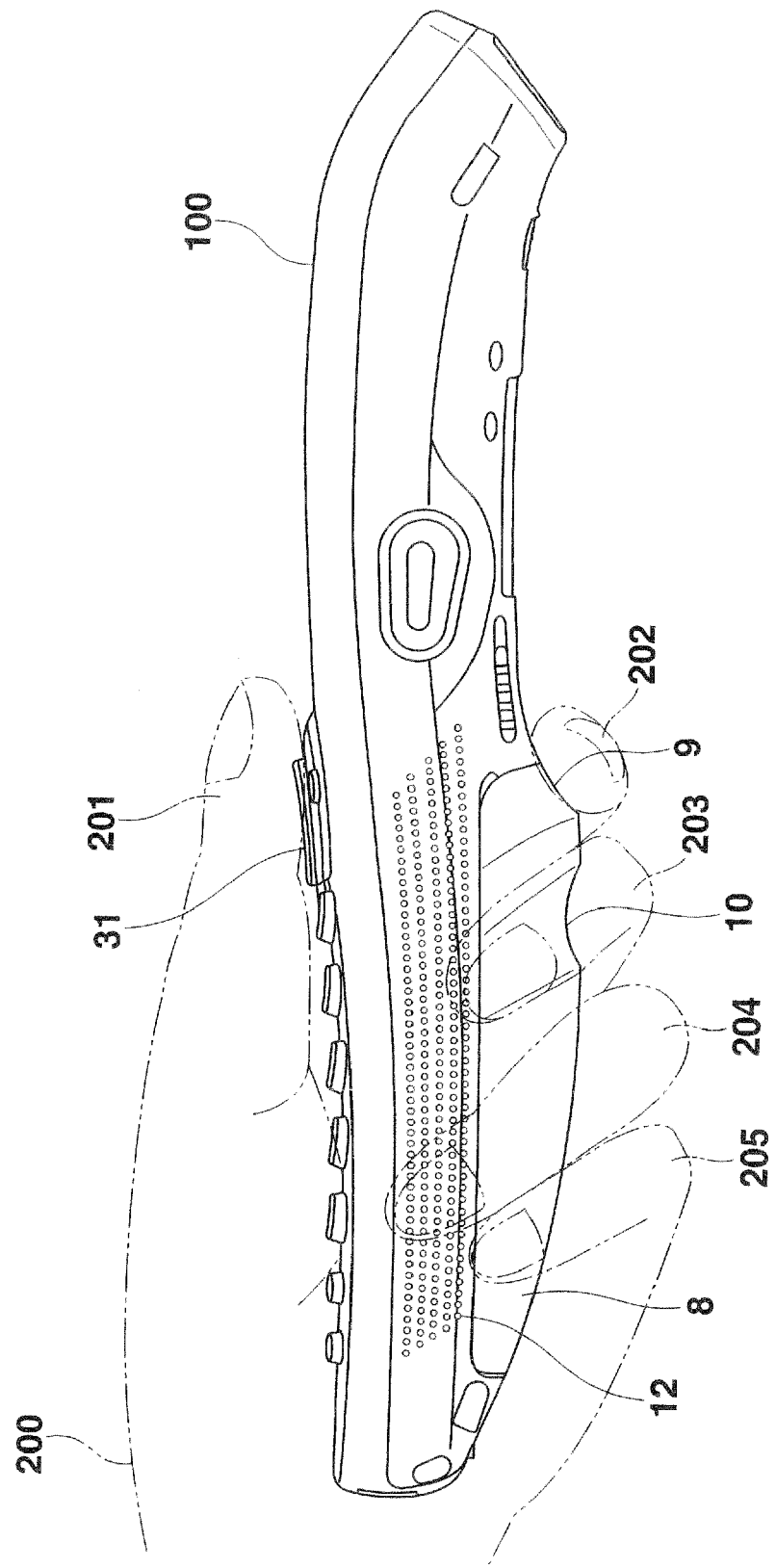
FIG. 6 is a view showing a state where a user is operating a center trigger key while holding the electronic handheld device by left hand.

When a right-handed user grips the electronic handheld device 100 with the right hand from the front face to hold the electronic handheld device 100, a middle finger of the user latches onto one of a latching portion 10 and a latching portion 9, and an index finger is placed on a position where the side trigger key 32A is provided at a position reachable and be easily pressed by the index finger (FIG. 8) When a left-handed user grips the electronic handheld device 100 with the left hand from the front face to hold the electronic handheld device 100, a middle finger of the user latches onto one of the latching portion 10 and the latching portion 9, and an index finger is placed on a position where the side trigger key 32B is provided at a position reachable and be easily pressed by the index finger. When the user grips the electronic handheld device 100 to position a thumb of the user on the front face, i.e., when the user grips the electronic handheld device 100 to hold from the back face, the middle finger of the user is latched onto one of the latching portion 10 and the latching portion 9, and the thumb is placed on a position where the center trigger key 31 is easily pressed by the thumb (FIG. 6).

The numeric keypads 33 include a plurality of keys for inputting various numeric and characters by being pressed by the user. The numeric keypads 33 are provided on the front face of the case 1 at a position toward the bottom end from the center trigger key 31.

The enter key 34 is for accepting input of "enter" or "OK" when pressed by the user. The function key 35 is for accepting input of various functions when pressed by the user.

The speaker 4 is provided on the front face of the case 1 at a position toward the top end from the display 2, and outputs various sounds. The indicators 5 are provided on the front face of the case 1 at a position toward the left side from the speaker 4. The indicators 5 are provided with a light emitting element, such as an LED (Light Emitting Diode), and emit the light from the light emitting element. For example, when the barcode scanning operation is succeeded by a scanner unit 7, as described later, the user is notified of the success audibly and visually by the sound output from the speaker 4 and the light output by the indicators 5.

The power switch 6 is provided on the front face of the case 1 at a position toward the right side from the speaker 4, and accepts in input to power ON/OFF the electronic handheld device 100 by being pressed by the user. The microphone 41 is provided on the front face of the case 1 at a position near the bottom end and at approximate center in widthwise direction, and accepts the voice input, such as message, from the user. The respective positions of the speaker 4, the indicators 5, the power switch 6, and the microphone 41 are not limited to the positions described above.

A plurality of ribs 37 are arranged to partition the neighboring keys. By providing the ribs 37, an erroneous input by the user caused by multiply pressing neighboring keys can be prevented. Accordingly, larger keys can be arranged for the keys provided in the numeric keypads 33 to allow the user to easily press each keys in a comparatively small case 1. The ribs 37 may not provided between the keys that are not adjacently arranged and have some space therebetween (i.e. between the keys "1, 2, 3" and the keys "4, 5, 6" in the embodiment).

As shown in FIG. 2, the electronic handheld device 100 further includes the scanner unit 7, an attachment fixing recess 7A, a bulged portion 8, the latching portion 9 that serves as a first concave portion, the latching portion 10 that serves as a second concave portion, a concave portion 11 that serves as a third concave portion, antislip finished portions 12, and a pair of locks 19 (19A, 19B).

The scanner unit 7 is provided on the top end face of the case 1 and optically scans the barcodes attached to the merchandise. The scanner unit 7 is equipped with: a light emitting portion for emitting a light to the barcode; and a light receiving portion for receiving the light reflected from the barcode and converts the reflected light into an electric signal. The scanner unit 7 operates to emit the light and to read information on the barcodes in accordance with the operation input by the user by pressing the center trigger key 31 and the side trigger key 32A or 32B.

Figure 4:
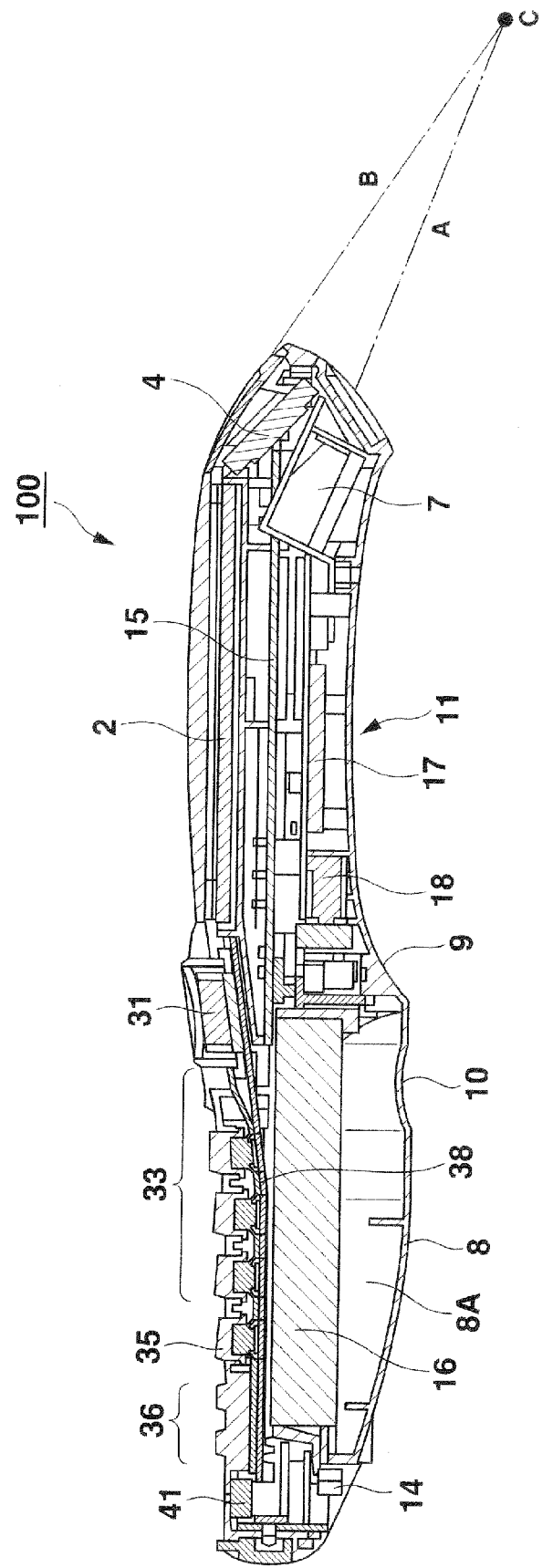
FIG. 4 is a sectional view of the electronic handheld device taken along a IV-IV line shown in FIG. 1.

The scanner unit 7 is provided in the case 1 at a position near the top end of the case 1 where being bent toward the back face. Since the scanner unit 7 is disposed in the case 1 so that the barcodes to be scanned is positioned on a prolonged line of a normal line of the top end face of the case 1, the user can easily aim at the barcodes along the top end face of the case 1 while holding the electronic handheld device 100 (FIG. 4).

The attachment fixing recess 7A of the case 1 serves as an engaging portion to which an attachment (not shown) is attached When the attachment is attached to the electronic handheld device 100 at the attachment fixing recess 7A, the user can let the attachment be in contact with a face of the merchandise where the barcodes are attached, to thereby increase the ease to aim the scanning light to the barcodes. According to the configuration, even a beginner user who is not accustomed to the scanning operation can operate the electronic handheld device 100 to easily scan the barcodes.

Without providing the bulged portion 8, the user can still feel a gripping sense when the user grips the electronic handheld device 100, however, since the case 1 is tapered downward gradually toward the bottom face side, the electronic handheld device 100 may be slip off from the hand of the user. In order to prevent the slip-off, the electronic handheld device 100 is provided with the bulged portion 8.

The bulged portion 8 is formed as a part of the case 1, and provided on the backside of the operating portion 3 at a position near to the bottom end of the case 1. The bulged portion 8 is formed in a bulged (half-egg) shape (substantially half-elliptic shape) That is, the bulged portion 8 is formed to have a ridgeline, in longitudinal direction of the electronic handheld device 100, which has a smaller angle with the front face where the operating portion 3 is provided at a position near to the top end (the position where the latching portions 9, 10 are formed) than at a position near the bottom end. In other words, the bulged portion 8 is formed in a roundish shape having a larger thickness at a position near to the top end (the position opposite the center trigger key 31) than a position near to the bottom end in the longitudinal direction. Since the bulged portion 8 is formed to have a shape thus described, the case 1 has a larger thickness at a position near the center trigger key 31 than at a position near the bottom end and slimmed at the bottom end as shown in FIGS. 2 and 6-8.

Accordingly, when the user grips the electronic handheld device 100 from the back face, the bulged portion 8 fits the overall palm of the user's hand and thus a user's secure feeling is increased. Also, an half-egg shape has a large strength against an external force. Accordingly, when the electronic handheld device 100 is dropped, no concentration of stress is caused and an impact is scattered at the bulged portion 8, so that the drop impact resistance of the electronic handheld device 100 can be improved. Therefore, a thickness of the bulged portion 8 (and the case 1) can be reduced thinner than that in the structure to which the bulged portion 8 is not provided, and a weight reduction can be implemented.

The latching portions 9, 10 are formed on the bulged portion 8 on the back face of the case 1 and allow the user to latch the fingers thereon. The latching portion 9 is arranged to be in a center-of-gravity position G of the electronic handheld device 100 and positioned near the back side of the center trigger key 31. Also, it is preferable that, when viewed from the side face, a center of the latching portion 9 should be positioned near the back side of the center trigger key 31 at a position displaced toward to the top end from the center of the center trigger key 31.

The latching portions 9, 10 are curved concavely such that the user's fingers fit naturally therein when the user holds the case 1. When the latching portions 9, 10 are viewed from the side face of the case 1, the latching portions 9, 10 are formed in a bow shape that inclines toward the top end of the case 1. As shown in FIG. 2, when the case 1 is viewed from the right face, the latching portions 9, 10 are curved from the center portion (the upper right side) of the back face of the case 1 to the bottom end side (the lower left side) on the front face.

The latching portion 10 is arranged in a position corresponding to the back side of the numeric keypads 33. The side trigger keys 32A, 32B are arranged in positions where the index finger can easily press the side trigger key 32A or 32B when the user grips the case 1 from the front face, as described later while latching the middle finger on the latching portion 10.

The concave portion 11 is formed to be in a concaved shape on the case 1 by a shape of the scanner unit 7 and the bulged portion 8. Since the concave portion 11 is provided, the user can easily grip and lift the electronic handheld device 100 by putting the fingers into a space formed by the concave portion 11 in a situation that the electronic handheld device 100 is placed on a flat surface, such as on the desk, to face the back face of the electronic handheld device 100 downward.

The antislip finished portion 12 is provided beside the operating portion 3 on both side surfaces of the case 1. The antislip finished portion 12 is formed with a number of protrusions formed by surface finishing. Respective protrusions have a anti-slip gripping effect when the user holds the electronic handheld device 100. Also, corner portions (end portions) of the case 1 around the operating portion 3 are chamfered. Therefore, the user's pleasant feeling by the touch with the middle finger, the third finger, and the little finger can be improved, and also the user's grip feeling can be improved. As a result, the electronic handheld device 100 can improve the user's secure feeling when holding the electronic handheld device 100.

The pair of locks 19 (19A, 19B) is operated to slide when engaging portions 19C, which will be described later (FIG. 5), is to be unlocked to open a battery lid 8B.

When viewed from the side, respective keys of the numeric keypads 33 shown in FIG. 2 are arranged in stepwise manner to be disposed higher at a side toward the top end than at a side toward the bottom end, while each of the keys in the numeric keypads 33 are formed in a shape that is slightly higher at the bottom end side of the electronic handheld device 100 than at the top end side of the electronic handheld device 100. Therefore, even when respective keys of the numeric keypads 33 are reduced in size, the user can easily press respective keys of the numeric keypads 33. The arrangement of the keys of the numeric keypads 33 will be described later with reference to FIG. 4.

As shown in FIG. 3, the electronic handheld device 100 is further provided with a communication terminal 14. The communication terminal 14 is provided at the bottom end on the back face, and serves as the connection terminal that is used to communicate with the external equipment. The electronic handheld device 100 can be placed n a cradle (not shown). The cradle is connected to a commercial power and a communication cable of the external equipment. In a situation that the electronic handheld device 100 is placed on the cradle, charging terminals 13 are connected to the charging terminals of the cradle, and also the communication terminal 14 is connected to the communication terminal of the cradle. In the state connected to the cradle, the electronic handheld device 100 can be charged via the charging terminals 13, while establishing a communication with the external equipment.

The latching portions 9, 10 are curved and concaved such that the user's fingers naturally fit in the latching portions 9, 10 when the user holds the case 1. When the latching portions 9, 10 are viewed from the back face of the case 1, the latching portions 9, 10 are formed in an arched shape that is arched toward the top end of the case 1. As shown in FIG. 3, the latching portions 9, 10 are curved from the center of the back face of the case 1 toward both end portions at the bottom end (the right downward direction and the left downward direction).

Next, an internal configuration of the electronic handheld device 100 will be explained with reference to FIG. 4. A sectional configuration of the electronic handheld device 100 taken along an IV-IV line in FIG. 1 is shown in FIG. 4.

As shown in FIG. 4, the electronic handheld device 100 is provided with, inside the case 1, the display 2, the speaker 4, the scanner unit 7, the charging terminals 13, the communication terminal 14, a circuit board 15, a main battery 16, an auxiliary battery 17, and a vibrator 18. The scanner unit 7 emits a light along a light emitting direction A (information reading direction) that is configured to intersect with a normal line B of the top end surface of the case 1 at an intersection point C. Therefore, the user who holds the electronic handheld device 100 is able to easily aim at the barcode along the light emitting direction A of the scanner unit 7.

The circuit board 15 is a PCB (Printed Circuit Board), and is provided in the case 1 at a position corresponding to positions of the display 2 and the operating portion 3. The circuit board 15 is connected to respective electronic components of the electronic handheld device 100. The main battery 16 is provided in the case 1 to correspond to a position of the operating portion 3. The main battery 16 is a rechargeable battery that is detachably attached and is rechargeable, and is formed of a rechargeable lithium battery, for example.

The auxiliary battery 17 is provided in the case 1 at a position corresponding to a position of the bottom end side of the latching portion 9. The auxiliary battery 17 is a rechargeable battery that is fixedly provided in the case 1 and is rechargeable. When the power supplied by the main battery 16 becomes low, the auxiliary battery 17 starts supplying a power instead of the main battery 16. The main battery 16 and the auxiliary battery 17 are charged via the charging terminals 13.

The vibrator 18 is provided in the case 1 at a position corresponding to a position of the bottom end side of the auxiliary battery 17, and produces a vibration. For example, when the barcode scanning succeeded in scanning the barcode by the scanner unit 7 described later, the vibrator 18 outputs the vibration to tactually notify the user of the effect of success.

A hollow portion 8A is provided inside the bulged portion 8. Since the hollow portion 8A is provided, a shape of the bulged portion 8 can be ensured and also a weight reduction of the electronic handheld device 100 can be attained. Shapes of individual keys of the numeric keypads 33 are formed such that their sides to be arranged toward the bottom end of the electronic handheld device 100 are positioned slightly higher than their sides to be arranged toward the top end of the electronic handheld device 100, and respective keys of the numeric keypads 33 are arranged on a keyboard substrate 38 that is provided in the case 1 to be heightened from the bottom end side toward the top end side. As a result, respective keys are aligned stepwise and heightened from the bottom end side toward the top end side. In a situation that the user presses the numeric keypads 33 with a thumb 201 while holding the electronic handheld device 100 in a state shown in FIG. 7, the key touch of the thumb 201 can be improved when the user operates respective keys by using the thumb 201, and the operability can be improved because respective keys are aligned stepwise and heightened from the bottom end side toward the top end side.

The components whose weight is relatively heavy are arranged in a portion in the case 1 near the latching portion 9 as densely as possible such that a center of gravity of the electronic handheld device 100 is positioned near the center between the top end and the bottom end of the case 1.

Next, a configuration of the battery lid 8B as a lid portion of the bulged portion 8 will be explained with reference to FIG. 5. A perspective configuration of a backside of the electronic handheld device 100 from which the battery lid 8B is uncovered is shown in FIG. 5.

Figure 5:
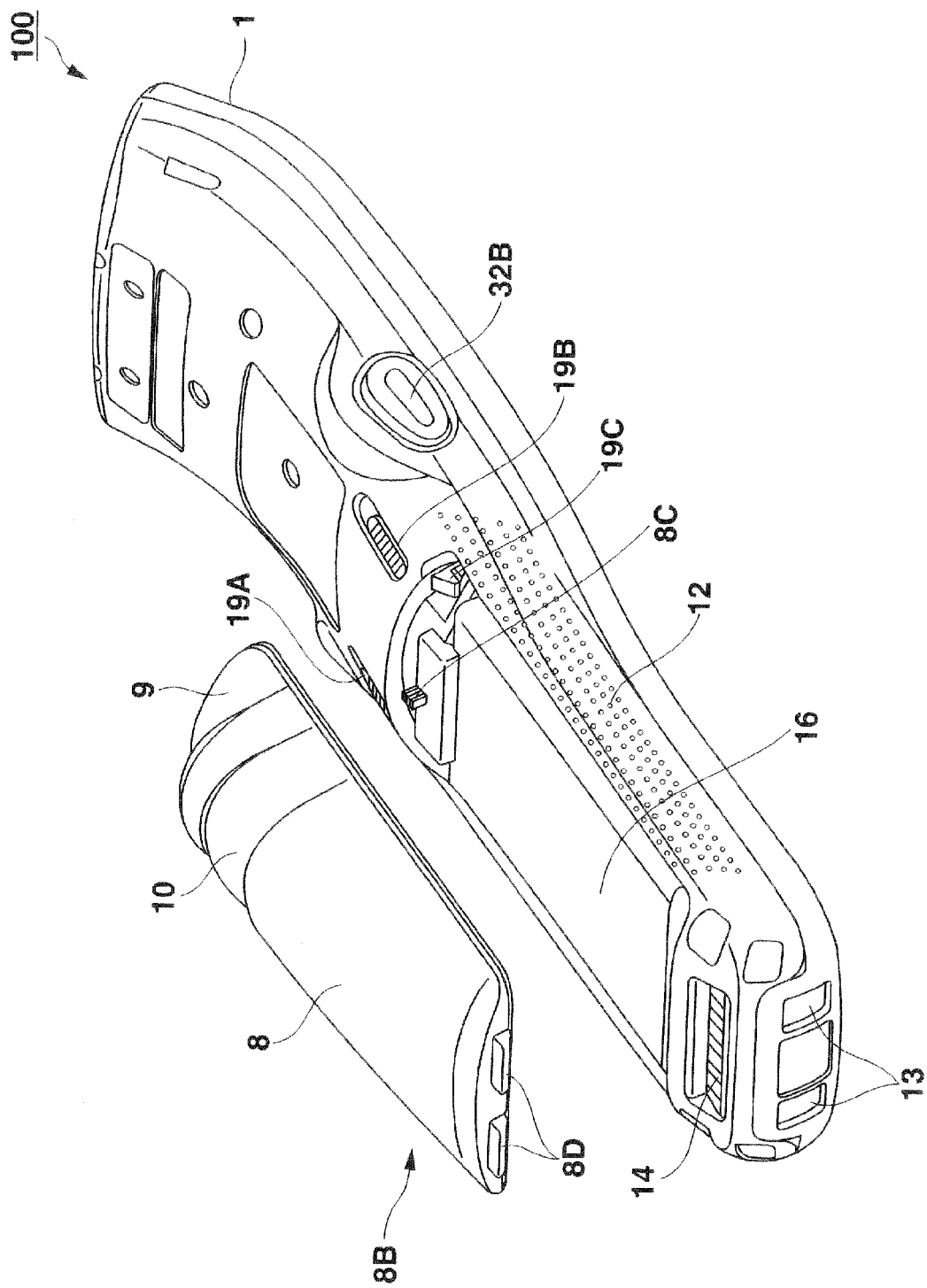
FIG. 5 is a perspective view of a backside of the electronic handheld device from which a bulged portion is uncovered.

As shown in FIG. 5, the bulged portion 8 is configured to serve as the battery lid 8B of the main battery 16. The lock of the engaging portions 19C, 19C is released by sliding locking portions 19A, 19B, and then the battery lid 8B is opened. For example, a plurality of bulged portions 8 (battery lids 8B) whose shape is different respectively in response to a size of user's hand, a shape of user's hand when closed may be prepared. When the bulged portion 8 (the battery lid 8B) prepared for the current user is exchanged for the bulged portion 8 (the battery lid 8B) having an appropriate shape that fits in with the next user, the bulged portion 8 may be fitted in with the different user's hand that is holding the electronic handheld device 100 respectively. The bulged portion 8 (the battery lid 8B) whose shape is different to meet a particular size when a large-capacity battery is used as the main battery 16, or the like may be prepared. In this case, 8C denotes a abutment detection portion that detects abutment of the battery lid 8B.

Figure 7:
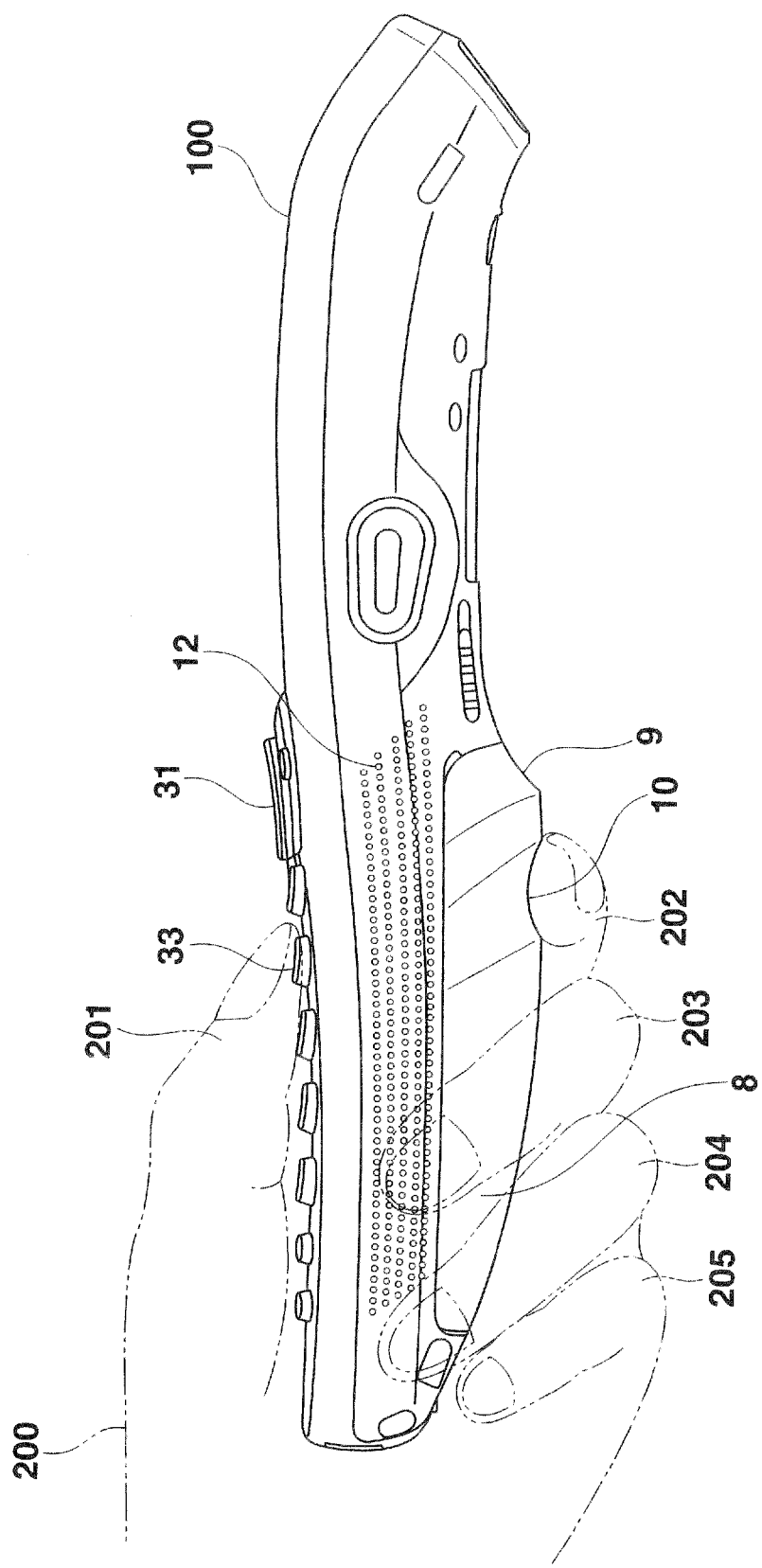
FIG. 7 is a view showing a state where the user is operating a numeric pad while holding the electronic handheld device by left hand.
Figure 8:
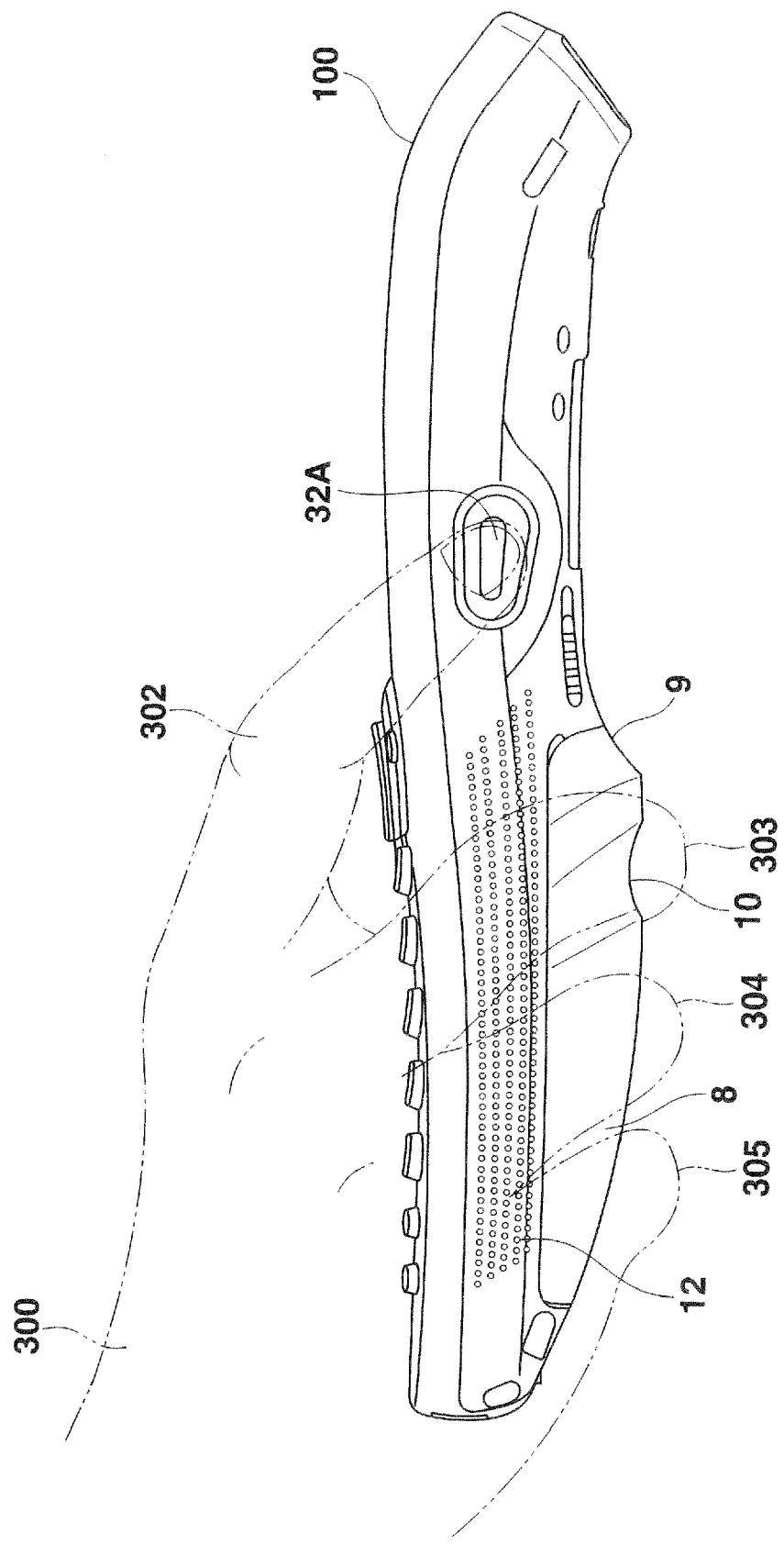
FIG. 8 is a view showing a state where the user is operating a side trigger key while holding the electronic handheld device in right hand.

Next, operation states that the user holds and operates the electronic handheld device 100 will be explained with reference to FIG. 6 to FIG. 9. A state that the user operates a center trigger key 31 while holding the electronic handheld device 100 in a left hand 200 is shown in FIG. 6. A side configuration in a state that the user operates numeric keypads 33 while holding the electronic handheld device in the left hand 200 is shown in FIG. 7. A side configuration in a state that the user operates a side trigger key 32A while holding the electronic handheld device 100 in a right hand 300 is shown in FIG. 8. A perspective configuration in a state in which the user operates a side trigger key 32B while holding the electronic handheld device 100 in the left hand 200 is shown in FIG. 9.

As shown in FIG. 6, when the user presses the center trigger key 31 of the electronic handheld device 100, the user holds the electronic handheld device 100 with a left hand 200 from the back face side, for example. The user holds the electronic handheld device 100 while putting an index finger 202 of the left hand 200 on the latching portion 9. The left hand 200 fits naturally in with the bulged portion 8, a middle finger 203 is put on the latching portion 10, a third finger 204 and a little finger 205 are positioned on the right face of the case 1, and the thumb 201 is positioned on the center trigger key 31. Also, tips of the middle finger 203, the third finger 204, and the little finger 205 are positioned on the antislip finished portion 12.

In a state shown in FIG. 6, the user presses the center trigger key 31 with the thumb 201 while holding the electronic handheld device 100. In particular, the light emitting direction A of the scanner unit 7 of the electronic handheld device 100 can be directed easily to the barcode, and then the user can easily perform operation for scanning the barcode by pressing the center trigger key 31 in the posture. Thus, the user can perform the scanning operation comfortably not to apply an extra burden on the arm during the scanning operation (while pressing the center trigger key 31). Also, the holding positional relationship shown in FIG. 6 can prevent that the electronic handheld device 100 is unstable in the scanning operation. Also, the user may hold the electronic handheld device 100 while latching the middle finger 203 on the latching portion 9. The user may press the center trigger key 31 while holding the electronic handheld device 100.

Since the latching portion 9 is located in a center of gravity G, a tonus of the user's arm can be relaxed when the user holds the electronic handheld device 100 When the user latches the index finger 202 on the latching portion 9 located in the center of gravity G, a weight balance of the case 1 can be maintained. Therefore, the user can hold the electronic handheld device 100 more firmly, the drop of the electronic handheld device 100 can be prevented, and user's fatigue in the long-time operation can be lessened. In particular, an extra burden is imposed on the user's muscles because a holding position of the electronic handheld device 100 is not fixed, the fingers are not placed stably, and the user continues to feel a weight of the electronic handheld device 100, and thus the user feels fatigue. However, a user's weight feeling can be lessened by holding the electronic handheld device 100 in the foregoing way shown in FIG. 6.

As shown in FIG. 7, when the user presses the numeric keypads 33 of the electronic handheld device 100, the user holds the electronic handheld device 100 with the left hand 200 from the back face side, for example. The user holds the electronic handheld device 100 while latching the index finger 202 of the left hand 200 on the latching portion 10. Then, the left hand 200 fits naturally in with the bulged portion 8, the middle finger 203 and the third finger 204 are positioned on the right face of the case 1, and the thumb 201 is positioned on the numeric keypads 33. Also, tips of the middle finger 203 and the third finger 204 are positioned on the antislip finished portion 12.

In a state shown in FIG. 7, the user presses the numeric keypads 33 with the thumb 201 while holding the electronic handheld device 100. Thus, the user can operate the numeric keypads 33 comfortably not to apply an extra burden on the arm during the numeric-key operation (while pressing the numeric keypads 33) Also, the holding positional relationship as shown in FIG. 7 can prevent that the electronic handheld device 100 is unstable in the numeric-key operation. Also, the user may hold the electronic handheld device 100 while latching the middle finger 203 on the latching portion 10. This is true of the case where the user presses the numeric keypads 33 while holding the electronic handheld device 100 with the right hand 300.

As shown in FIG. 8, when the user presses the side trigger key 32A of the electronic handheld device 100, the user holds the electronic handheld device 100 with the right hand 300 from the front face side, for example. The user holds the electronic handheld device 100 while putting a middle finger 303 of the right hand 300 on the latching portion 10. Then, a third finger 304 and a little finger 305 fit naturally in with the bulged portion 8, and an index finger 302 is positioned on the side trigger key 32A.

In a state shown in FIG. 8, the user presses the side trigger key 32A with the index finger 302 while holding the electronic handheld device 100. In particular, the light emitting direction A of the scanner unit 7 of the electronic handheld device 100 can be directed easily to the barcode, and then the user can easily scan the barcode by pressing the side trigger key 32A in that posture. In this event, a ridgeline becomes longer from the operating portion 3 on the front face to the back side by providing the bulged portion 8. Therefore, a user's sense of discomfort in the holding condition in FIG. 8 can he removed.

As shown in FIG. 9, this is true of the case where the user presses the side trigger key 32B while holding the electronic handheld device 100 with the left hand 200. Also, since the display 2 is not concealed by the left hand 200 or the right hand 300 when the user presses the side trigger key 32A or 32B, the user can press the side trigger key 32A or 32B while viewing firmly the display 2.

With the above, according to the present embodiment, the latching portion 9 is provided around the center as the center-of-gravity position G on the back face of the case 1, and the center trigger key 31 is provided in a corresponding position of the front face of the case 1. Therefore, the user can hold stably the electronic handheld device 100 by putting the index figure on the latching portion 9, and a user's sense of weight can be lessened. In this state, the user can press easily the center trigger key 31 with the thumb.

The latching portion 10 is provided on the bottom end side rather than the latching portion 9 on the back face of the case 1, and the numeric keypads 33 is provided in a corresponding position of the front face of the case 1. Therefore, the user can hold stably the electronic handheld device 100 by putting the index figure on the latching portion 10, and the user can press easily the numeric keypads 33 with the thumb in this state. As a result, the operability can be improved.

The bulged portion 8 that is formed in a half-elliptical spherical shape is provided on the back face of the case 1. Therefore, the bulged portion 8 fits in with the hand, and the user can hold the electronic handheld device 100 firmly, so that the user can feel an affinity for the hand. Since the bulged portion 8 is provided, a strength of the electronic handheld device 100 can be increased and thus a weight can be decreased by thinning a thickness of the bulged portion 8.

The side trigger keys 32A, 32B are provided on both side surfaces of the case 1 on which the index finger is positioned in a state that the user holds the electronic handheld device 100 front the front face while latching the middle finger on the latching portion 10. Therefore, the user can press easily the side trigger key 32A or 32B while latching the middle finger on the latching portion 9.

The concave portion 11 is provided on the back face of the case 1. Therefore, the user can grip and lift the electronic handheld device 100 easily and firmly by putting the fingers into the space formed by the concave portion 11 in a situation that the electronic handheld device 100 is placed on a flat surface, such as on the desk, to face its back face downward.

The bulged portion 8 serves as the battery lid 8B that is detachably attached. Therefore, the bulged portion 8 can be easily exchanged, and the bulged portion 8 now in use can be exchanged with another type of the bulged portion 8 having a different shape corresponding to a shape of the hand of the next user, to thereby improve the operability. Also, the bulged portion 8 corresponding to a shape of the main battery 16 can be provided.

The display 2 is provided on the top end side of the center trigger key 31 on the front face of the case 1. Therefore, the display 2 is not concealed by the hand in a state that the user holds the case 1 from the front face while putting the middle finger on the latching portion 10, and the user can view the display without fail.

The numeric keypads 33 is aligned stepwise so that respective keys are heightened from the bottom end side to the top end side. Therefore, the user can press easily the keys even when the numeric keypads 33 is small, and the operability can be improved. As a result, a downsizing of the electronic handheld device 100 can be achieved by reducing the numeric keypads 33 in size.

A density of the components of the electronic handheld device 100 can be set high near the latching portion 9, which is located near the center-of-gravity position. Therefore, when the user holds the electronic handheld device 100 while latching the finger on the latching portion 9, a weight balance of the electronic handheld device 100 can be improved, and a posture can be kept stably.

In the above description, the embodiment is described only as an example of the present invention. The scope of the present invention should not be limited to the embodiment described in the above.

In the above embodiment, the electronic handheld device 100 is described as an example. The present invention may be embodied as other electronic handheld devices such as PDA (Personal Digital Assistant), a remote controller for controlling electric apparatuses, or the like.

In the above embodiment, the antislip finished portion 12 is provided on both side surfaces of the case 1. However, the antislip finished portion 12, or any members or surface finish that serve as the antislip finished portion 12 may be provided to at least one of the latching portions 9, 10.

In the above embodiment, the side trigger keys 32A, 32B are arranged in positions corresponding to those of the index finger located in a situation that the user holds the case 1 from the front face while latching the middle finger on the latching portion 10. However, the side trigger keys 32A, 32B may be arranged in positions of the index finger located in a situation that the user holds the case 1 from the front face while latching the middle finger on the latching portion 9.

In the above embodiment, the center trigger key 31, the side trigger keys 32A, 32B, and the numeric keypads 33 are assumed to be configured as press-button-type keys. However, any types of keys, such as a slide key, a jog-dial key, and other types of keys may be used as the center trigger key 31, the side trigger keys 32A, 32B, and the numeric keypads 33.

Those keys may be configured to input operations other than those described in the embodiment.

At least one of the latching portions 9, 10 may be provided on the bulged portion 8. A part of all of at least one of the latching portions 9, 10 may be provided as the exchangeable lid.

It should be noted that detailed configurations and detailed operations of respective components of the electronic handheld device 100 according to the above embodiment can be appropriately modified without departing a scope of the claimed invention.

What is claimed is:

1. An electronic handheld device comprising:
   a case that is formed in a longitudinal boxed shape, the case comprising:
   (i) a top half portion formed in an arched shape that is convex toward a front face of the case, wherein the top half portion comprises a top end portion including a scanner unit that emits scanning light, and the top end portion is inclined toward a back face of the case such that the scanning light is emitted in an obliquely downward direction, and
   (ii) a bottom half portion formed in an arched shape that is convex toward the back face of the case, wherein the bottom half portion comprises a bulged portion formed on the back face and has a bulged shape configured to fit to a palm of a user;
   a first operation key that is provided on the front face of the case at a position that is located at an approximate center of the front face; and
   a first concave portion that is formed on the back face of the case at a first position opposite the position of the first operation key, the first concave portion being arched toward the top end portion of the case along a top edge of the bulged portion.

2. The device according to claim 1, further comprising a second concave portion that is formed on the back face at a second position that is located between the first position and a bottom end of the case, the second concave portion being arched toward the top end portion of the case along the top edge of the bulged portion.

3. The device according to claim 2, further comprising a second operation key that is provided on the front face of the case at a position opposite the second position.

4. The device according to claim 3, wherein the second operation key is provided with a plurality of keys that are arranged stepwise along the front face of the bottom half portion, which is arched toward the back face of the case.

5. The device according to claim 3, wherein the second operation key comprises a plurality of keys that are partitioned by a rib that is disposed between the keys.

6. The device according to claim 1, further comprising a lid member that is disposed on the back face, wherein at least a part of the first concave portion is formed on the lid member.

7. The device according to claim 1, further comprising a lid member that is disposed on the back face, wherein at least a part of the second concave portion is formed on the lid member.

8. The device according to claim 1, further comprising a third operation key that is provided on at least one of side faces of the case at a position corresponding to a position reachable by an index finger of a user in a state where the user latches a middle finger on the first concave portion.

9. The device according to claim 1 further comprising a third operation key that is provided on at least one of side faces of the case at a position corresponding to a position reachable by an index finger of a user in a state where the user latches a middle finger on the second concave portion.

10. The device according to claim 1, further comprising a display device that is provided on the front face at a position between the position of the first operation key and the top end portion.

11. The device according to claim 1, further comprising a third concave portion that is formed on the back face at a position between the first position and the top end portion.

12. The device according to claim 1, further comprising components that are arranged in the case to have larger density at an approximate center of the case.

13. The device according to claim 1, further comprising antislip finished portions provided on both side faces of the case, the antislip finished portions being formed with a number of protrusions.

14. An electronic handheld device comprising:
    a case that is formed in a longitudinal boxed shape, the case comprising:
    (i) a top half portion formed in an arched shape that is convex toward a front face of the case, wherein the top half portion comprises a top end portion including a scanner unit that emits scanning light, and the top end portion is inclined toward a back face of the case such that the scanning light is emitted in an obliquely downward direction, and
    (ii) a bottom half portion formed in an arched shape that is convex toward the back face of the case, wherein the bottom half portion comprises a bulged portion formed on the back face and has a bulged shape configured to fit to a palm of a user;
    a first operation key that is provided on the front face of the case at a position that is located at an approximate center of the front face;
    a first concave portion that is formed on the back face of the case at a first position opposite the position of the first operation key, the first concave portion being arched toward the top end portion of the case along a top edge of the bulged portion;
    a second concave portion that is formed on the back face at a second position that is located between the first position and a bottom end of the case, the second concave portion being arched toward the top end portion of the case along the top edge of the bulged portion; and
    a second operation key that is provided on the front face of the case at a position opposite the second position.

15. The device according to claim 14 further comprising a third operation key that is provided on at least one of side faces of the case at a position corresponding to a position reachable by an index finger of a user in a state where the user latches a middle finger on the first concave portion.

16. The device according to claim 14, further comprising a lid member that is disposed on the back face, wherein at least a part of the first concave portion is formed on the lid member.

17. The device according to claim 14, further comprising a display device that is provided on the front face at a position between the position of the first operation key and the top end portion.

18. The device according to claim 14, wherein the second operation key is provided with a plurality of keys that are arranged stepwise along the front face of the bottom half portion, which is arched toward the back face of the case.

19. The device according to claim 14, wherein the second operation key comprises a plurality of keys that are partitioned by a rib that is disposed between the keys.

20. The device according to claim 14, further comprising a third concave portion that is formed on the back face at a position between the first position and the top end portion.

21. The device according to claim 14, further comprising components that are arranged in the case to have larger density at an approximate center of the case.

22. The device according to claim 14, further comprising antislip finished portions provided on both side faces of the case, the antislip finished portions being formed with a number of protrusions.

* * * * *